United States Patent [19]

Cerne

[11] 4,042,193
[45] Aug. 16, 1977

[54] SAFETY DEVICE FOR AIRCRAFT DOORS OR HATCHES

[75] Inventor: Gerd Cerne, Bremen, Germany

[73] Assignee: Vereinigte Flugtechnische Werke-Fokker GmbH, Bremen, Germany

[21] Appl. No.: 703,599

[22] Filed: July 8, 1976

[30] Foreign Application Priority Data

July 19, 1975 Germany .............................. 2532350

[51] Int. Cl.² .............................................. B64C 1/14
[52] U.S. Cl. ..................................... 244/129.1; 49/21; 49/31; 180/113; 244/76 B; 244/129.5; 292/144
[58] Field of Search ......... 244/129 R, 129 D, 42 CA, 244/121, 76 B; 296/137 H; 180/112, 113; 292/144, 201; 49/21, 31

[56] References Cited

U.S. PATENT DOCUMENTS

| | | | |
|---|---|---|---|
| 1,701,491 | 2/1929 | Casey | 244/129 D |
| 1,951,464 | 3/1934 | Wragg | 244/42 A |
| 2,189,748 | 2/1940 | Wilson | 180/113 |
| 2,342,184 | 2/1944 | Fawcett | 244/42 A |
| 2,348,426 | 5/1944 | Sparrow | 244/76 B |
| 2,748,855 | 6/1956 | Siems et al. | 244/129 D |
| 2,793,825 | 5/1957 | Highley | 244/42 A |
| 3,004,303 | 10/1961 | Wilmer | 244/129 D |
| 3,830,332 | 8/1974 | Fontaine | 180/113 |

Primary Examiner—Trygve M. Blix
Assistant Examiner—Galen L. Barefoot
Attorney, Agent, or Firm—Ralf H. Siegemund

[57] ABSTRACT

A door or hatch operating mechanism is blocked by a bolt when the aircraft moves in that dynamic pressure is sensed by a spring biased displaceable large piston moving a small piston which acts on a hydraulic link acting, in turn, on another spring biased piston which holds the bolt in locking position or releases it.

6 Claims, 8 Drawing Figures

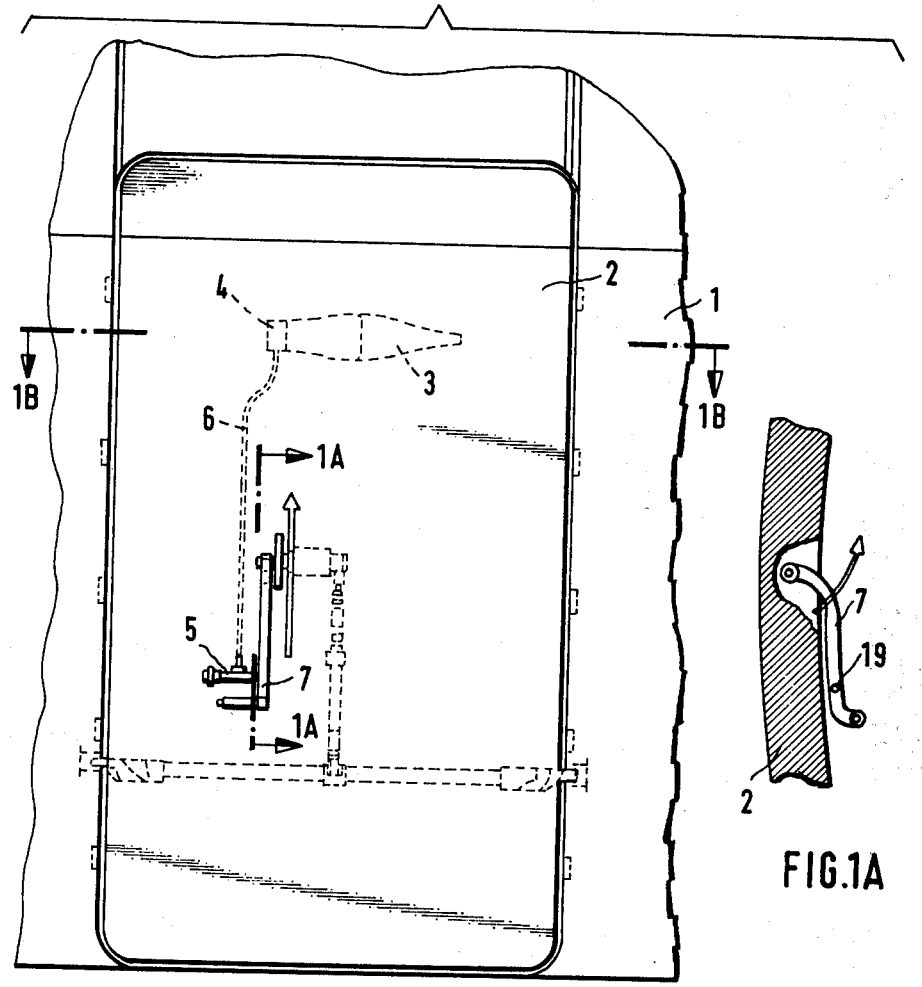

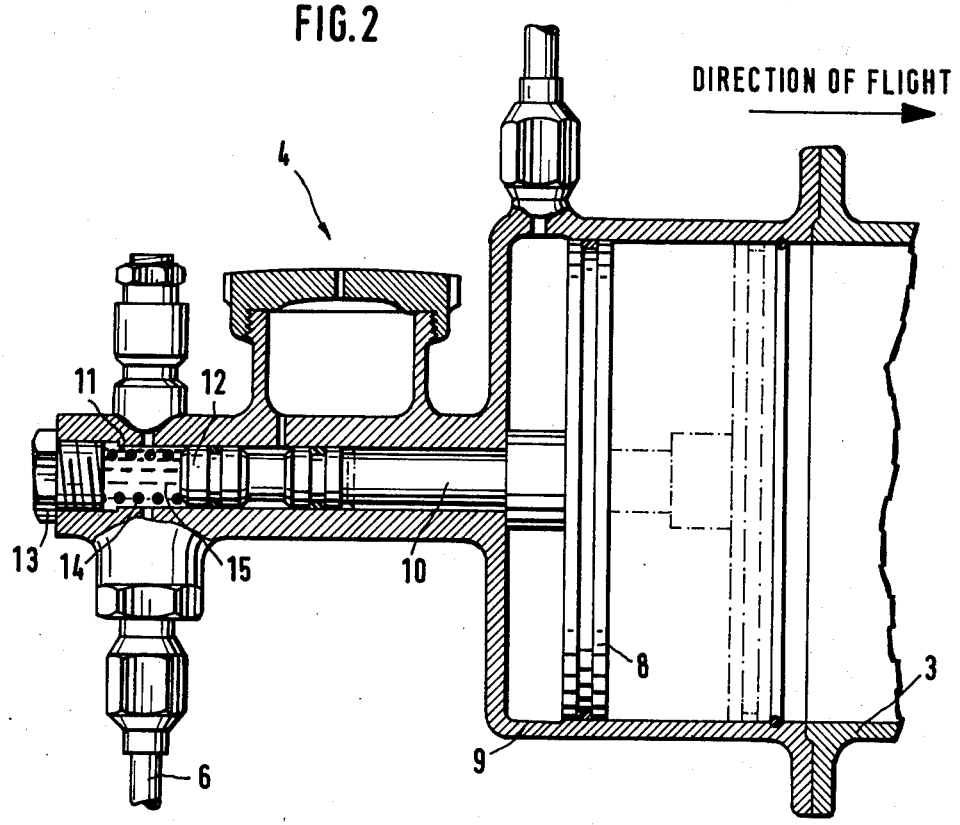

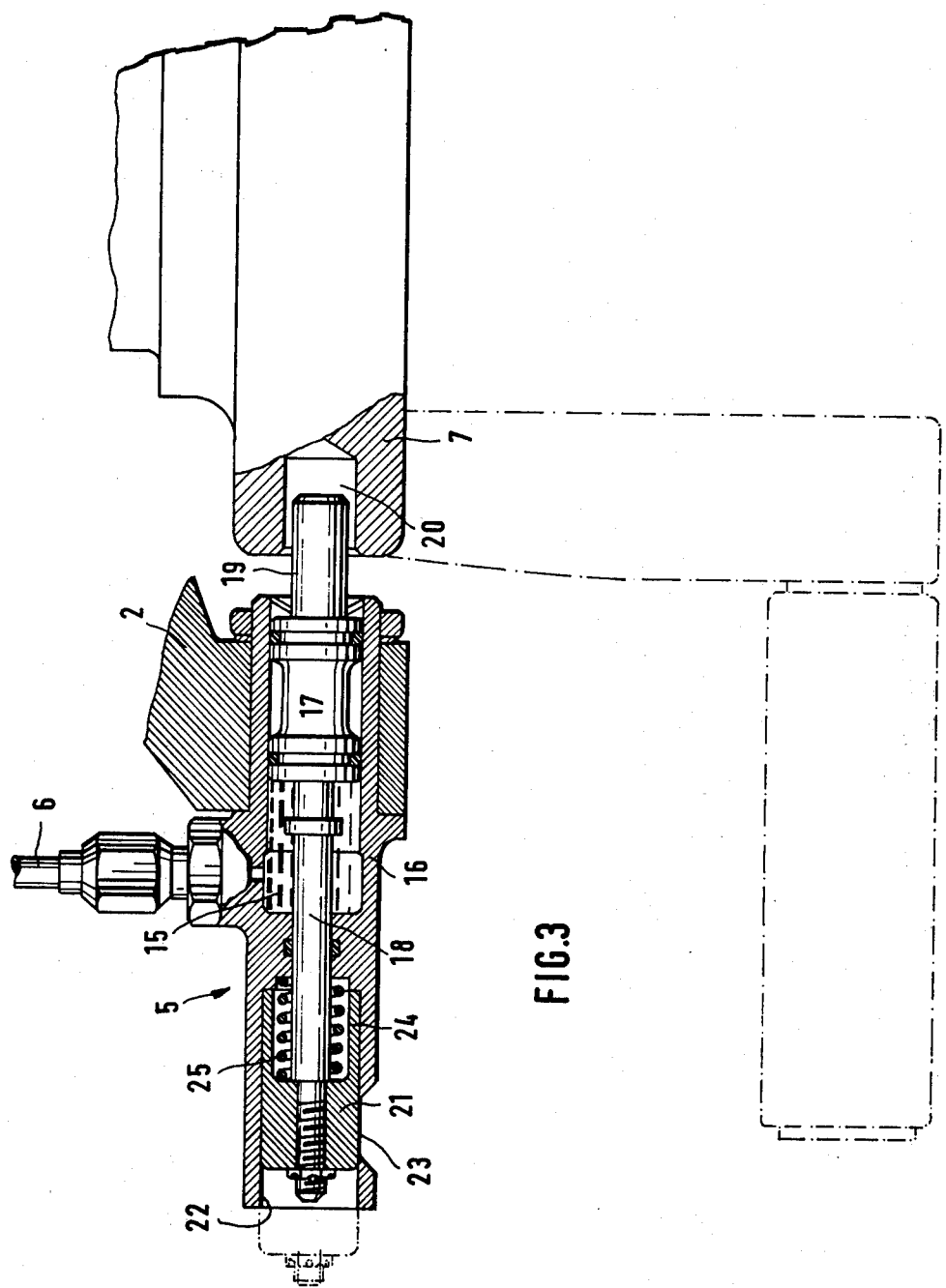

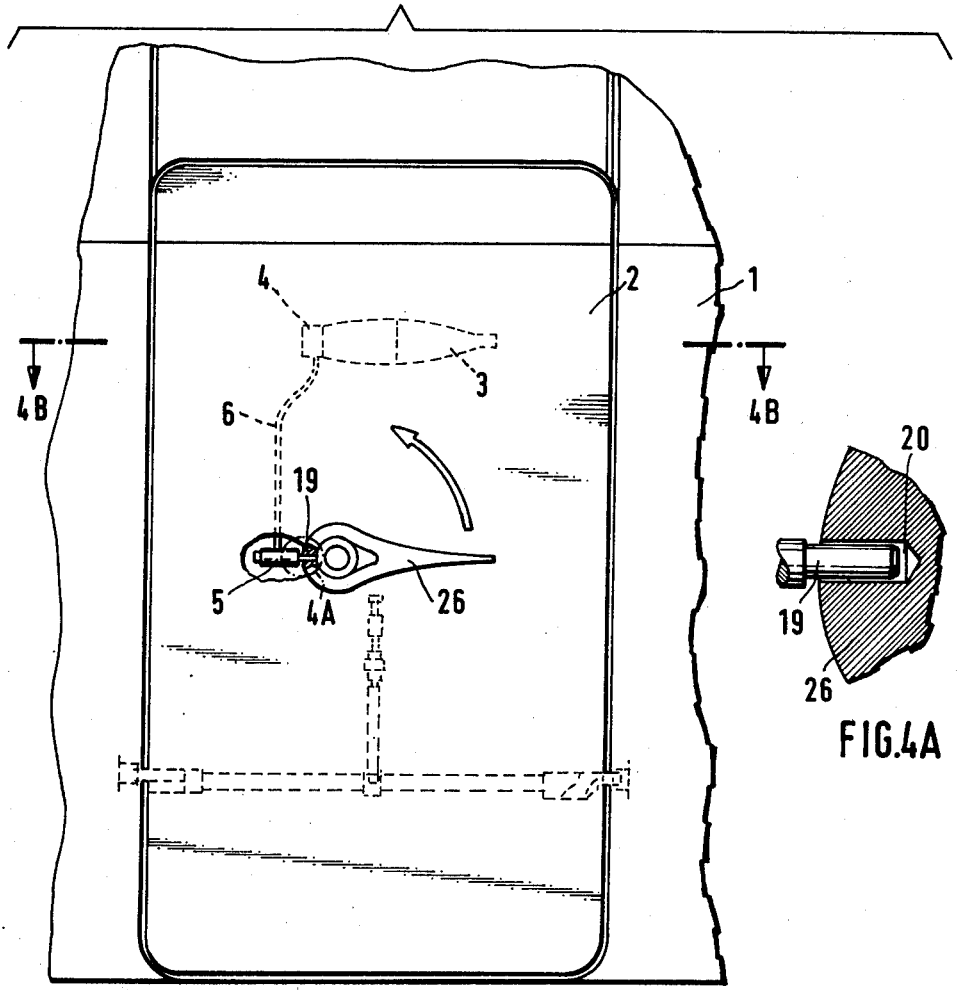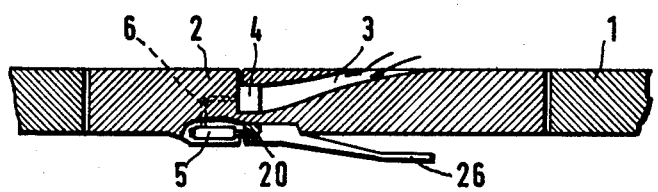

SAFETY DEVICE FOR AIRCRAFT DOORS OR HATCHES

BACKGROUND OF THE INVENTION

The present invention relates to the securing of door or hatch locks in aircrafts, which locks are to be manually operated, particularly unlocked for opening the respective door and hatch.

The doors of airplanes are usually unlocked in that a door opening lever is actuated for unlocking its locking mechanism. Whenever a door or a hatch is provided as an emergency exit, the locking mechanism is coupled to the lever actuating the door or hatch so that a single motion of that lever unlocks and opens the door.

Such a device is, for example, disclosed in U.S. Pat. No. 3,004,303. This patent discloses particularly projections or noses arranged along the frame periphery of the door as well as at the door itself and these noses face and engage each other when the door is locked. Upon raising the door the projections or noses of the door pass through the gaps and spaces between the projections on the frame.

In the closed position, the doors and hatches are maintained in position through friction between the respectively engaging noses particularly because the higher pressure inside of the aircraft cabin provides an outwardly directed force which acts accordingly on the door and reenforces the frictional engagement between the noses. In addition, bolts running in longitudinal direction of the aircraft secure the locking position of the door. For unlocking and opening, a particular lever is manually operated so that in fact a single motion of the lever unlocks and opens the door.

This mode of operation satisfies the international requirements for airplane safety. The reason is particularly to be seen in that the door may also serve as an emergency exit and must be opened rather quickly. As long as the pressure in the cabin is sufficiently larger than the outside pressure, it is not possible to open the door, simply because it is impossible to manually overcome the friction between the projections as reinforced by this pressure differential. However, if the aircraft is still very close to ground, either because it just took off or it is just about ready to approach the runway for landing, this differential is minimal or non-existent so that the friction will no longer impede the opening of the door, and, in fact, a single motion of that lever will permit opening of the door even if the craft is still in flight. It is, however, quite undesirable that in such case, while the plane has still or already considerable speed, it is actually possible to open the door.

DESCRIPTION OF THE INVENTION

It is an object of the present invention to provide a new and improved door or hatch locking mechanism for aircraft which prevents the opening of the door during the flight, irrespective of a pressure differential.

In accordance with the preferred embodiment of the present invention, it is suggested to provide transducer means for sensing dynamic or head pressure external to the aircraft so as to determine whether or not the craft is in motion and to provide means for selectively securing or releasing the door or hatch locking and opening mechanism and which are controlled for securing the latter mechanism when dynamic pressure is sensed while the mechanism is released when absence of such pressure indicates that the craft is at least not moving very fast.

In furtherance of the invention, the transducer means may be a pneumatic device with a piston acted upon by dynamic pressure; the means for securing and releasing may be a simple latch bolt which, for example, locks or releases the door handle. The link between pneumatic device and bolt may be a hydraulic one in that the pneumatic piston moves another piston which displaces a hydraulic fluid so that the latter actuates a further piston which, in turn, advances the bolt. Retraction may be provided through spring bias.

The inventive securing and safety structure establishes dynamically conditions for positively preventing opening of doors and hatches from the time the plane has gained some speed to a time after landing. Therefor, passenger safety is greatly increased, as the doors can be opened only when the system no longer senses dynamic pressure.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 shows an aircraft door in front view;

FIG. 1a illustrates a section view in accordance with lines a—a in FIG. 1;

FIG. 1b is a section view along lines b—b in FIG. 1;

FIG. 2 is a section view through a head pressure responsive transducer used within the inventive door lock system;

FIG. 3 is a section view showing in detail the locking unit in accordance with the preferred embodiment after the present invention;

FIGS. 4, 4a, and 4b, are views similar to FIGS. 1, 1a, and 1b. of a modified door lock device.

Proceeding now to the detailed description of the drawings, FIG. 1 illustrates the wall of a fuselage 1 of a commercial airplane having a door 2 to be provided with a locking mechanism in accordance with the preferred embodiment of the present invention. In accordance with the invention, there is provided an air entrance duct 3 which is located on the outside and communicates with the exterior of the craft at such an orientation that it senses head or dynamic pressure. The duct 3 terminates in the interior of the door and by means of a transducer 4 which responds to the dynamic pressure. The transducer is provided as input element for operating hydraulic mechanical locking device 5, there being a connection 6 provided between transducer 4 and the locking device.

The air entrance duct 3 has an opening within a strake and is a so-called NACA - entrance which provides a conversion or transduction of the dynamic air pressure into a static pressure which, in turn, is the input proper for the transducer 4. This pneumatic input signal is converted into a hydraulic signal within the unit 4 which, in turn, is connected through a conduit 6 to the locking unit 5, receiving, therefore, this hydraulic signal. This hydraulic signal causes a shifting of a locking bolt or pin 19 which, when advanced, engages a door actuating lever 7. The lever or handle 7 is the device which is being manually operated for opening the door, but upon protraction of the pin 19, this opening is prevented. Pin 19 is, therefore, advanced by combined (serially) pneumatic and hydraulic action, whenever the transducer 4 senses a particular dynamic pressure indicative of motion of the aircraft.

The lever 7 is otherwise connected to a locking or latching, and unlocking device as it is conventional for aircraft doors and hatches, complying strictly with the requirements for international air safety, and particularly constructed for complying here within the rules set forth for emergency exits. It can, therefore, be seen that the door 2 can be unlocked and opened by operation of lever 7 for opening the door towards the outside and in the regular manner, provided that the aircraft is, in fact, at rest. The particular locking mechanism is shown with dotted lines in FIG. 1, and as a part of the door, but this added illustration is provided only to tie that part of the door to the particular features of the present invention. This door locking mechanism is, in fact, known and not part of the invention. The figure shows also the projections and noses which provide locking proper between the door and the door frame. Again, it has to be said that these parts are not part of the invention.

FIG. 2 shows in greater detail the pneumatic-hydraulic transducer 4. The pneumatic portion of this transducer is comprised of a piston 8, which is moveably disposed in a cylinder chamber 9. The piston 8 is connected to a piston rod 10 and moves the rod 10 accordingly. The particular air duct 3 is disposed generally to the right of the piston 8, and is acted upon by the air pressure at the end of duct 3. Cylinder chamber 9 actually continues the duct and piston 8 establishes, therefore, separation.

The hydraulic part of the transducer 4 is comprised of a hydraulic cylinder 11 in which is disposed a piston 12. Of course, the piston 12 can move in the cylinder 11. The hydraulic cylinder 11 actually is a continuation of the housing or casing for the cylinder 9, and both cylinders are parts of a single piece of structure. The bore of hydraulic cylinder 11, as defining the hydraulic cylinder chamber, does not only receive the hydraulic piston 12 but also the piston rod 10 of the pneumatic device. The bore of the hydraulic cylinder 11 is locked with a screw 13, against which bears a return or recoiling spring 14, which bears also against the hydraulically operating piston 12. This spring 14 actually biases the piston assembly 12, 8, and is balanced by the dynamic pressure that acts upon piston 8.

The cylinder chamber 11 is filled with hydraulic fluid 15, and this particular portion of the hydraulic cylinder 11 is hydraulic-conductively connected with the locking device 5 via duct 6.

Turning now to FIG. 3 there is shown the locking unit 5, and one can see the other end of duct 6 in the top portion of that figure. The duct or conduit 6 leads into a cylinder chamber 16 likewise filled with hydraulic fluid 15 and pertaining to a hydraulic drive having a piston 17 which is capable of slidng inside of the chamber 16. The right-hand side of piston 17 is sealed so that a continuation can project from cylinder 16 and the projecting part is continued in the locking bolt 19.

The locking bolt 19, when advanced or protracted, can be inserted into a bore 20 of the door actuating lever 7, whereupon the lever is prevented from being actuated. Upon retraction of the piston 17, the actuating lever 7 is, in fact, released by retraction of the pin or bolt 19. The hydraulic cylinder 16 is actually part of and secured to the door 2. Thus, the door is positively locked through blocking the lever 7 as long as the hydraulic does not retract the bolt 19.

The other end of the piston rod 18 is provided with a so-called signaling or indicating piston 21 which slides in a corresponding signal or indicating cylinder 22, being a part of and pertaining integrally to the cylinder 16. The cylinder 22 has, in addition, a window 23 arranged on its periphery through which one can see the position of the piston 21. Thus, the visible position of piston 21 is an indication as to whether pin 9 locks or releases the door handle 7.

The piston 21 has continuation 24 which receives a retraction or return spring 25 which bears with its other side against the bottom of the cylinders 22, which is also part of the housng of cylinder 16. Spring 25 biases the integral piston and piston rod and pin assembly 17, 18, 19, 21, towards retracting pin 19.

This particular arrangement functions as follows. As soon as the aircraft moves at a certain speed, a pressure head is generated in the duct 3 which affects the pneumatic piston 8 and pushes the piston inwardly in cylinder 9. This way, piston rod 10 causes hydraulic piston 12 to move against the force of the return spring 14 and forces hydraulic fluid 15 out of the cylinder 11. The fluid passes through the duct 6 and enters the chamber 16 so that the piston 17 is caused to advance accordingly. The bolt 19 is shifted into the locking bore 20, against the force of the spring 25, and the door actuating lever 7 is now secured. The door handle 7 has been previously placed in locking position and now the handle itself is secured and locked dynamically. Please note that no auxiliary force is needed; the power to hold pin 19 in the secured and locking position is derived externally from the dynamic pressure as hydraulically transmitted to pin 19. The resulting position of piston 17 is directly transmitted upon the signaling piston 21, the position of which can be observed through window 23.

As long as the craft is in flight or at least has a non-negligible speed, there is sufficient dynamic pressure on the system, and the locking mechanism is held dynamically in that locking position. Upon dropping of the dynamic pressure below its threshold, the spring 14 will cause piston 12 to be shifted so that hydraulic fluid is sucked back through duct 6 out of chamber 16, and the spring 25 will cause the piston 17 to pull the pin 19 out of door 20. The door lever 7 is now released and his release position is clearly visible in window 23, and the door can now be opened.

The return springs 14 and 25 in the transducer and locking units on one hand, and the effective surfaces of pistons 8, 12, and 17, are attuned to each other so that the function as described, in particularly the sequence of operation, is insured particularly as far as locking the handle 7 is concerned. Security conditions are established from shortly after takeoff until landing of the plane.

FIG. 4 shows now a modification of the inventive locking and safety structure whereby in this particular case a lever 26 is provided as a handle which turns about an axis which extends transversely to the plane of the drawing as well as to the plane of the door. In this particular case, the locking pin 19 engages a bore in the hub of the pivot lever 26. Otherwise, the arrangement is constructed quite similarly to the one as shown in the preceding figures.

The locking and safety arrangement as described can be constructed so that the particular locking pin or bolt 19 does not necessarily lock the actuating lever or door handle, but it may engage any other lever or linkage which would normally be actuated by the door handle or lever, but whose position is arrested by a projecting pin 19, to thereby inactivate the door unlocking mechanism. The particular combination of a transducer for the head pressure and the locking unit 5 is shown to be a combined pneumatic hydraulic system but the hydraulic link is not essential per se, one can use instead a strictly mechanical linkage. It should also be mentioned, as was outlined earlier, that one of the functions of the conventional door locking mechanism is an inherent response to the inside-outside pressure differential. It can be seen, however, that the inventive safety and locking device has nothing to do with pressure differential. It is, therefore, applicable also to unpressured aircraft.

The invention is not limited to the embodiments described above but all changes and modifications thereof not constituting departures from the spirit and scope of the invention are intended to be included.

I claim:

1. In a device for securing door or hatch locks in aircrafts having manually operable means for unlocking and opening the door or hatch, the combination comprising:
    transducer means including a piston means disposed to be displaced in response to dynamic pressure developed upon movement of the craft;
    a bolt disposed for selectively securing and releasing the manually operable means, thereby respectively impeding and permitting manual unlocking and opening of the door or hatch;
    a piston connected to said bolt for operating same; and
    control means including a hydraulic connection connected to the transducer means to be responsive to presence or absence of a dynamic pressure as sensed by the transducer means, and as displacing the piston means, thereby displacing hydraulic fluid in said hydraulic connection which then operates said piston thereby operating said bolt in response to said presence and absence of the dynamic pressure as sensed.

2. In a device as in claim 1, wherein the piston means is disposed in a unitary chamber means being acted upon from one side by air pressure, said chamber means having a hydraulic fluid chamber on the other side of the piston means.

3. In a device as in claim 2, said piston means including a first, large piston exposed to air, and a second small piston acting on the hydraulic fluid, the first and second pistons being interconnected by a common piston rod.

4. In a device as in claim 1, said piston means being spring biased to rectract the piston means when the air pressure drops.

5. In a device as in claim 1, at least some of said pistons being spring biased for rectracting said pin.

6. In a device as in claim 1, said control means including visible indicating means for indicating a securing position and a releasing position of said means for securing and releasing.

* * * * *